United States Patent
Graham et al.

(10) Patent No.: US 12,220,858 B2
(45) Date of Patent: Feb. 11, 2025

(54) ABRASIVE SHEET INCLUDING A PLURALITY OF PROTRUSIONS

(71) Applicant: 3M INNOVATIVE PROPERTIES COMPANY, St. Paul, MN (US)

(72) Inventors: Paul D. Graham, Woodbury, MN (US); Douglas A. Davis, Cottage Grove, MN (US); Thomas E. Pahl, Cottage Grove, MN (US); John G. Petersen, Center City, MN (US); Graham M. Clarke, Woodbury, MN (US); James J. Kobe, Newport, MN (US); Thomas B. Galush, Roseville, MN (US); Charles R. Wald, Oakdale, MN (US); Brian W. Lueck, Houlton, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 535 days.

(21) Appl. No.: 17/555,242

(22) Filed: Dec. 17, 2021

(65) Prior Publication Data
US 2022/0105605 A1    Apr. 7, 2022

Related U.S. Application Data

(62) Division of application No. 16/611,340, filed as application No. PCT/US2018/031039 on May 4, 2018, now abandoned.

(Continued)

(51) Int. Cl.
*B29C 59/04*    (2006.01)
*B24D 11/00*    (2006.01)
(Continued)

(52) U.S. Cl.
CPC .......... *B29C 59/046* (2013.01); *B24D 11/005* (2013.01); *B24D 11/02* (2013.01);
(Continued)

(58) Field of Classification Search
CPC ... B24D 11/001; B24D 11/005; B29C 59/046; B32B 27/08
(Continued)

(56) References Cited

U.S. PATENT DOCUMENTS

| | | |
|---|---|---|
| 1,559,114 A | 10/1925 | Maranville |
| 4,497,072 A | 2/1985 | Watanabe |

(Continued)

FOREIGN PATENT DOCUMENTS

| | | |
|---|---|---|
| WO | WO 2005-026434 | 3/2005 |
| WO | WO 2016-085791 | 6/2016 |
| WO | WO 2018-208588 | 11/2018 |

OTHER PUBLICATIONS

International Search Report for PCT International Application No. PCT/US2018/031039, mailed on Aug. 1, 2018, 4 pages.
(Continued)

*Primary Examiner* — James D Sells (57) ABSTRACT

Various embodiments disclosed relate to an abrasive sheet. The abrasive sheet includes a first layer including an abrasive major surface and an opposite second layer defining a second major surface. The second major surface includes a plurality of protrusions extending outwardly from the second major surface. The protrusions include a first polymer component having at least one of a Shore A hardness ranging from about 5 to about 100 and a Shore D hardness ranging from about 1 to about 70. The first layer and the second layer are directly joined to each other.

21 Claims, 4 Drawing Sheets

Related U.S. Application Data (60) Provisional application No. 62/503,469, filed on May 9, 2017.

(51) Int. Cl.
  *B24D 11/02* (2006.01)
  *B32B 3/18* (2006.01)
  *B32B 27/08* (2006.01)
  *B32B 27/00* (2006.01)
  *B32B 27/30* (2006.01)
  *B32B 27/40* (2006.01)

(52) U.S. Cl.
  CPC ............ *B32B 3/18* (2013.01); *B32B 27/08* (2013.01); *B24D 11/001* (2013.01); *B29C 2948/00* (2019.02); *B32B 27/00* (2013.01); *B32B 27/302* (2013.01); *B32B 27/40* (2013.01); *B32B 2307/536* (2013.01); *B32B 2307/538* (2013.01); *Y10T 428/1352* (2015.01)

(58) Field of Classification Search
  USPC .......................................................... 156/60
  See application file for complete search history.

(56) References Cited

U.S. PATENT DOCUMENTS

| | | |
|---|---|---|
| 5,650,215 A | 7/1997 | Mazurek |
| 5,672,097 A | 9/1997 | Hoopman |
| 6,440,880 B2 | 8/2002 | Mazurek |
| 6,673,417 B1 | 1/2004 | Gudet |
| 6,904,615 B2 | 6/2005 | Kobe |
| 6,993,793 B1 | 2/2006 | Li |
| 7,037,100 B2 | 5/2006 | Strobel |
| 7,635,264 B2 | 12/2009 | Strobel |
| 10,207,392 B2* | 2/2019 | Carter .................. B24D 11/001 |
| 2004/0001021 A1 | 1/2004 | Choo |
| 2004/0020133 A1 | 2/2004 | Paxton |
| 2017/0095019 A1 | 4/2017 | Milbocker |
| 2017/0304996 A1* | 10/2017 | Graham ................ B32B 27/08 |

OTHER PUBLICATIONS

International Search Report for PCT International Application No. PCT/US2018/031035, mailed on Oct. 15, 2018, 6 pages.

\* cited by examiner

ABRASIVE SHEET INCLUDING A PLURALITY OF PROTRUSIONS

CROSS REFERENCE TO RELATED APPLICATIONS

This application is a divisional application U.S. application Ser. No. 16/611,340, filed Nov. 6, 2019, which is a national stage filing under 35 U.S.C. 371 of PCT/US2018/031039, filed May 4, 2018, which claims the benefit of U.S. Application No. 62/503,469, filed May 9, 2017, the disclosure of which is incorporated by reference in its/their entirety herein.

BACKGROUND

Many abrasive sheets sol in the marketplace have an attachment surface on their non-abrasive surface to facilitate their attachment to various sanding accessories. These accessories can be included to improve the ability of the end-user to efficiently move the abrasive along the surface of the workpiece. As an example, many abrasives contain a woven fabric that provides a set of loops that bond to a set of hooks on a foam sanding accessory.

SUMMARY OF THE DISCLOSURE

The present disclosure provides an abrasive sheet. Various embodiments disclosed relate to an abrasive sheet. The abrasive sheet includes a first layer including an abrasive major surface and an opposite second layer defining a second major surface. The second major surface includes a plurality of protrusions extending outwardly from the second major surface. The protrusions include a first polymer component having at least one of a Shore A hardness ranging from about 5 to about 100 and a Shore D hardness ranging from about 1 to about 70. The first layer and the second layer are directly joined to each other.

The present disclosure further provides a method of making an abrasive sheet a first layer including an abrasive major surface and an opposite second layer defining a second major surface. The second major surface includes a plurality of protrusions extending outwardly from the second major surface. The protrusions include a first polymer component having at least one of a Shore A hardness ranging from about 5 to about 100 and a Shore D hardness ranging from about 1 to about 70. The first layer and the second layer are directly joined to each other. The method includes forming a first assembly. The first assembly includes a support having a plurality of holes defined on a support major surface. The first polymer component at least partially fills at least one of the holes of the support and forms a layer thereon. The method further includes coating the first polymer component with an abrasive material.

The present disclosure further provides a method of using an abrasive sheet a first layer including an abrasive major surface and an opposite second layer defining a second major surface. The second major surface includes a plurality of protrusions extending outwardly from the second major surface. The protrusions include a first polymer component having at least one of a Shore A hardness ranging from about 5 to about 100 and a Shore D hardness ranging from about 1 to about 70. The first layer and the second layer are directly joined to each other. The method includes frictionally engaging the plurality of protrusions with a substrate. The method further includes engaging the first abrasive surface with a working surface of an object. The method further includes moving the abrasive sheet relative to the working surface to abrade the working surface.

There are several advantages associated with the abrasive sheet according to various embodiments of this disclosure, at least some of which are unexpected. For example, according to various embodiments of this disclosure, advantageously, an abrasive article according to various embodiments has a high friction surface that prevents slippage when engaged to a substrate such as a hand or gloved hand. In some embodiments this can render an accessory (e.g., a gripping accessory or sanding accessory) unnecessary under circumstances where they were previously needed. This, along with an absence of a scrim, can allow the operator to have an improved tactile feel when sanding a workpiece and possibly be more comfortable for the user and allow the user to fit the sheet into more narrow or contoured spaces than a corresponding abrasive sheet including an accessory. According to various embodiments, if the operator decides to use a sanding accessory, the high friction surface can still be beneficial because it can prevent relative movement between the abrasive sheet and accessory. By using frictional contact, this solution is also easier to use than conventional fastening mechanisms such as adhesives, latches, clips, and hook-and-loop attachment layers, each of which can require significant operator intervention in both placing and removing the abrasive article. Additionally, according to some examples the gripping layer can provide a high friction surface capable of maintaining high friction in many environments including wet, dusty and oily environments. The friction in some examples, can be increased in instances where two such gripping surfaces are contacted with each other such the protrusions at least partially interlock (e.g., through folding the sheet or combining two sheets). Additionally, according to some examples the gripping layer can be used as a wipe for cleaning up debris such as sanding debris.

A method of manufacturing the abrasive article according to various embodiments advantageously can lead to faster processing speeds, fewer manufacturing steps, and greater flexibility in selecting a manufacturing location. For example, methods for producing high-aspect ratio stems can involve casting a polymer onto a casting roll with a set of holes in it, wherein the casting roll must be warm enough to allow a polymer to flow into the holes, yet it must be cool enough to allow a polymer film to be removed from the casting roll. The need to maintain the casting roll at this intermediate temperature can compromise the cooling rate of the polymer coating. As a result, in these methods it may be necessary to reduce the line speed so that the polymer coating is given sufficient time to cool on the cast roll prior to its separation. According to various embodiments, the disclosed method can differ in that the polymer coating can be applied to the support in one operation, and can be subsequently removed from the support in a second operation that can occur, for example, several days later. According to various embodiments, this can increase the line speed during manufacture as the line speed is not bounded by the need to allow sufficient cooling time.

According to various embodiments, a further advantage of the disclosed method is that there are fewer manufacturing steps compared to a method including laminating a film with stems to the back surface of the abrasive. In the case of the lamination method, the abrasive and the gripping layer can be made separately, followed by an additional lamination process. In contrast, the disclosed method can involve one extrusion coating step (coating the soft polymer onto the support) and a second abrasive coating step (applied to the soft polymer). Thus according to some embodiments there may be fewer steps than in a corresponding lamination method. Additionally, according to various embodiments, the disclosed manufacturing methods can allow for thinner constructions of the abrasive sheets, which can account for various advantages in both cost (less material usage) and performance (greater ease in getting into hard-to-reach areas).

According to various embodiments, a further advantage of the disclosed method is that it can be easier to find a suitable manufacturing site than for a corresponding method, which includes lamination of the abrasive layer or extrusion coating of an abrasive material with the gripping layer. For example, using lamination, finding a suitable manufacturing site can be challenging because such a method can require steps or devices to process the abrasive material. In the case of the extrusion coating method, this method can also require steps or devices to process an abrasive, as well as a casting station with adequate nip pressure to produce the stems. In both cases, processing the abrasive can be difficult due to wear; also, contamination can accompany processing of abrasives. In contrast, according to various embodiments of the disclosed method, an extrusion coating step can occur prior to abrasive coating. Therefore, many of the aforementioned considerations, such as unwind, the need for a casting station, the nip pressure requirement, wear, and contamination, can be substantially eliminated.

BRIEF DESCRIPTION OF THE FIGURES

The drawings illustrate generally, by way of example, but not by way of limitation, various embodiments discussed in the present document.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The following sections describe through illustration and example particular embodiments of the provided abrasive articles. Repeated use of reference characters in the specification and drawings generally represents the same or analogous features or elements within the disclosure. It should be understood that numerous other modifications and embodiments can be devised by those skilled in the art, which fall within the scope and spirit of the principles of the disclosure. The figures may not be drawn to scale.

Figure 1:
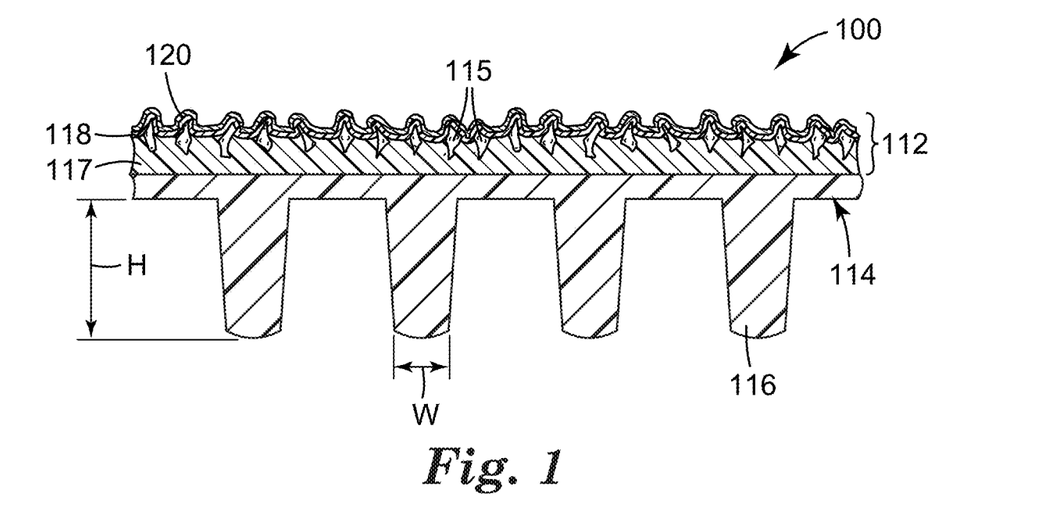
FIG. 1 is a sectional view of an abrasive sheet, in accordance with various embodiments.

As shown in FIG. 1, abrasive sheet 100 is a multi-component sheet. Abrasive sheet 100 includes coated abrasive layer 112 and a monolithic gripping layer 114, which includes a plurality of protrusions 116 extending therefrom. Each of the protrusions 116 has a composition that is substantially the same as the gripping layer 114. In other examples, protrusions 116 can have a different composition than gripping layer 114. Each of coated abrasive layer 112 and gripping layer 114 define external major surfaces of abrasive sheet 100.

Abrasive layer 112 can be continuous or discontinuous. Abrasive layer 112 can also include one or more components. For example, as shown in FIG. 1, abrasive layer 112 is a coated abrasive film including abrasive particles 115 secured to a plurality of hardened resin layers. Abrasive particles 115 can be arranged according to any predetermined pattern. In some embodiments, abrasive particles 115 are adhesively coupled to hardenable make layer 117 and size layer 118, and supersize layer 120. When thus secured, abrasive particles 115 are partially or fully embedded in respective layers 117, 118, 120, yet located at or sufficiently close to the surface of abrasive sheet 100, whereby abrasive particles 115 come into frictional contact with a substrate when abrasive sheet 100 is rubbed against the substrate.

In other examples abrasive layer 112 includes an abrasive composite where abrasive particles are uniformly mixed with a binder to form a viscous slurry. This slurry can then be cast and appropriately hardened (for example, using a thermal or radiation curing process) onto gripping layer 114 to obtain abrasive layer 112.

In other examples, an abrasive slurry can be molded onto gripping layer 114 to form a structured abrasive. Structured abrasives can be made by mixing abrasive particles and a hardenable precursor resin in a suitable binder resin (or binder precursor) to form a slurry, casting the slurry between the underlying film and a mold having tiny geometric cavities, and then hardening the binder. After hardening, the resulting abrasive coating is formed into a plurality of tiny, precisely shaped abrasive composite structures affixed to the underlying film. The hardening of the binder can be achieved by exposure to an energy source. Such energy sources can include, for example, thermal energy and radiant energy derived from an electron beam, ultraviolet light, or visible light.

Abrasive particles 115 are not limited by material and can be composed of any of a wide variety of hard minerals known in the art. Examples of suitable abrasive particles include, for example, fused aluminum oxide, heat treated aluminum oxide, white fused aluminum oxide, black silicon carbide, green silicon carbide, titanium diboride, boron carbide, silicon nitride, tungsten carbide, titanium carbide, diamond, cubic boron nitride, hexagonal boron nitride, garnet, fused alumina zirconia, alumina-based sol gel derived abrasive particles, silica, iron oxide, chromia, ceria, zirconia, titania, tin oxide, gamma alumina, and combinations thereof. The alumina abrasive particles can include a metal oxide modifier. The diamond and cubic boron nitride abrasive particles can be monocrystalline or polycrystalline. In some examples, there is a range or distribution of abrasive particle 115 sizes. The number average particle size of abrasive particles 115 can range from about 0.001 to about 300 micrometers, about 0.01 to about 250 micrometers, about 0.02 to about 100 micrometers, less than, equal to, or greater than about 0.001 micrometers, 0.01, 20, 40, 60, 80, 100, 120, 140, 160, 180, 200, 220, 240, 260, 280, or 300 micrometers.

In some examples, abrasive sheet 100 can include a continuous or discontinuous intermediate layer such as a base layer, adhesive layer, or an ink layer adjacent to abrasive layer 112 and gripping layer 114. If present, the base layer can be made from a polymeric film that can preserve or enhance the flexibility and resiliency of abrasive sheet 100. For example, the base layer can include an elastomeric film. The elastomeric film can be monolithic or can itself be a composite film having multiple layers produced by coextrusion, heat lamination, or adhesive bonding. Examples of materials that can be used in the elastomeric film include polyolefin, polyester (e.g., those available under the trade designation "HYTREL" from E. I. du Pont de Nemours & Co., Wilmington, Delaware), polyamide, styrene/butadiene copolymer (e.g., those available under the trade designation "KRATON" from Kraton Polymers, Houston, Texas), and polyurethane elastomers (e.g., polyurethane elastomers available under the trade designation "ESTANE 5701" and "ESTANE 5702"); chloroprene rubber, ethylene/propylene rubbers, polybutadiene rubber, polyisoprene rubber, natural or synthetic rubber, butyl rubber, silicone rubber, or EPDM rubber; and combinations thereof. Still other useful elastomeric films include pressure-sensitive adhesive coated polyurethane elastomer films, commercially available from 3M Company, St. Paul, Minnesota, under the trade designation "TEGADERM."

Abrasive sheet 100 can be configured to be free of intermediate layers such as a base layer. Abrasive sheet 100 can also be configured to be free of other support layers between abrasive layer 112 and gripping layer 114. For example, abrasive sheet 100 can be free of an intermediate support layer such as a scrim layer or an adhesive layer. A scrim layer can be generally understood to be an intermediate layer that the gripping layer 114 and the abrasive layer 112 are joined to, or the scrim may be joined to either gripping layer 114 or abrasive layer 112 and an intermediate layer. A scrim layer can be formed of many materials including a woven or non-woven material. In some examples of abrasive sheet 100, which are free of the scrim layer, gripping layer 114 and abrasive layer 112 are in direct contact with each other.

In examples of abrasive sheet 100 that include an adhesive layer, the adhesive layer can be adapted to extend along the bottom of gripping layer 114, abrasive layer 112, or both. Suitable examples of an adhesive for use with the adhesive layer include a pressure-sensitive adhesive. In some examples the pressure-sensitive adhesive can be a double-sided adhesive tape.

Protrusions 116 can be arranged according to either a random or non-random two-dimensional replicated pattern or array. In some examples, the external, exposed surfaces of protrusions 116 include a first polymer component.

Each of protrusions 116 can have a constant or variable cross-sectional shape. For example, as shown in FIG. 1, protrusions 116 are generally cylindrical in shape. Other examples of suitable shapes include truncated cones or pyramids, rectangles, hemispheres, squares, hexagons, octagons, and combinations thereof. As described herein, protrusions 116 can be made by extruding the polymer component onto a support having holes therein. Protrusions 116 are ultimately formed in the holes. As a result of being formed in a hole, the sides of protrusions 116 can have a slight taper to facilitate removal from the holes of the support. However, that the protrusions 116 can assume any of a number of non-cylindrical shapes, including truncated cones or pyramids, rectangles, hemispheres, squares, hexagons, octagons, non-regular polygons, and combinations thereof.

Protrusions 116 can have a configuration that facilitates some degree of deflection, or buckling, when compressive force is applied to gripping layer 114. Optionally and as shown, protrusions 116 have a certain height "H" and a certain width "W" (both shown in FIG. 1), where each is fairly uniform (or monodispersed) about an average respective value. Having a distribution of heights and widths, however, could also provide an acceptable gripping surface.

The height of protrusions 116 need not be particularly restricted, but a suitable example of abrasive sheet 100 uses protrusions 116 having an average height "H" of about 10 micrometers to about 800 micrometers, about 25 micrometers to about 700 micrometers, about 75 micrometers to about 600 micrometers, less than, equal to, or greater than about 10 micrometers, 25, 75, 100, 125, 150, 175, 200, 225, 250, 275, 300, 325, 350, 375, 400, 425, 450, 475, 500, 525, 550, 575, 600, 625, 650, 675, 700, 725, 750, 775, or 800 micrometers.

The number average height-to-width aspect ratio ("H/W") of protrusions 116 can range from about 0.5 to about 10, about 0.75 to about 7, about 1 to about 5, less than, equal to, or greater than about 0.5, 0.75, 1.0, 1.1, 1.2, 1.25, 2, 2.5, 3, 3.5, 4, 4.5, 5, 5.5, 6, 6.5, 7, 7.5, 8, 8.5, 9, 9.5, or 10. The number density of protrusions 116 can depend in part on their size, and can also vary based on the desired texture of gripping layer 114. In some examples, protrusions 116 have an area number density ranging from about 15 per square centimeter to about 3000 per square centimeter, about 50 per square centimeter to about 1250 per square centimeter, about 100 per square centimeter to about 1000 per square centimeter, about 150 per square centimeter to about 800 per square centimeter, about 250 per square centimeter to about 600 per square centimeter, less than about, equal to about, or greater than about 50 per square centimeter, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, or 3000 per square centimeter.

In some examples, protrusions 116 are substantially free of any undercuts and this can help to ensure that protrusions 116 do not significantly mechanically interlock with mating surfaces any optional device used to grip the abrasive sheet 100.

As mentioned, some or all of the gripping layer can include a polymer component. The polymer component can include one or more polymers. The one or more polymers can range from about 50 wt % to about 100 wt % of the polymer component, about 60 wt % to about 90 wt %, about 70 wt % to about 80 wt %, less than, equal to, or greater than 50 wt %, 55, 60, 65, 70, 75, 80, 85, 90, 95, or 100 wt %. At least one of the polymers can be an elastomer. The term "elastomer" reflects a property of the material: that it can undergo a substantial elongation and then return to its original dimensions upon release of the stress elongating the elastomer. In some cases an elastomer is able to undergo at least 10% elongation (at a thickness of 0.5 mm), and return to at least 50% recovery after being held at that elongation for 2 seconds and after being allowed 1 minute relaxation time. In some examples, an elastomer can undergo 25% elongation without exceeding its elastic limit. In some examples elastomers can undergo elongation to as much as 300% or more of their original dimensions without tearing or exceeding the elastic limit of the composition. Elastomers can be defined to reflect this elasticity as in ASTM Designation D883-96 as a macromolecular material that, at room temperature, returns rapidly to approximately its initial dimensions and shape after substantial deformation by a weak stress and release of the stress. ASTM Designation D412-98 A can be an appropriate procedure for testing rubber properties in tension to evaluate elastomeric properties.

For some applications, thermoset elastomers may be used. Generally, such compositions include relatively high molecular weight compounds which, upon curing, form an integrated network or structure. The curing may be by a variety of methods, including chemical curing: agents, catalysts, and/or irradiation.

The final physical properties of the material are a function of a variety of factors, including the number and weight average polymer molecular weights, the melting or softening point of the reinforcing domains of the elastomer, if any (which, for example, can be determined according to ASTM Designation D 1238-86), the percent by weight of the elastomer composition which comprises hard segment domains, the structure of the toughening or soft segment (low glass transition temperatures) portion of the elastomer composition; the crosslink density, and the nature and levels of additives or adjuvants.

Suitable classes of elastomers include anionic triblock copolymers, polyolefin-based thermoplastic elastomers, thermoplastic elastomers based on halogen-containing polyolefins, thermoplastic elastomers based on dynamically vulcanized elastomer-thermoplastic blends, thermoplastic polyether ester or polyester based elastomers, thermoplastic elastomers based on polyamides or polyimides, ionomeric thermoplastic elastomers, hydrogenated block copolymers in thermoplastic elastomer interpenetrating polymer networks, thermoplastic elastomers by carbocationic polymerization, polymer blends containing styrene/hydrogenated butadiene block copolymers, and polyacrylate- based thermoplastic elastomers. Some specific examples of elastomers are natural rubber, butyl rubber, EPDM rubber, silicone rubber such as polydimethyl siloxane, polyisoprene, polybutadiene, polyurethane, ethylene/propylene/diene terpolymer elastomers, chloroprene rubber, styrene-butadiene copolymers (random or block), styrene-isoprene copolymers (random or block), styrene-ethylene-butylene copolymers (random or block), acrylonitrile-butadiene copolymers, mixtures thereof and copolymers thereof. The block copolymers can be linear, radial or star configurations and may be diblock (AB) or triblock (ABA) copolymers mixtures thereof. Blends of these elastomers with each other or with modifying non-elastomers are also contemplated. Commercially available elastomers include block polymers (e.g., polystyrene materials with elastomeric segments), available from Shell Chemical Company of Houston, Texas, under the designation KRATON™. The hardness of the polymer used in protrusions 116 can be characterized by its Shore durometer. For example, the polymer can have a Shore A hardness ranging from about 5 to about 100, about 20 to about 40, less than, equal to, or greater than about 5, 10, 15, 20, 25, 30, 35, 40, 45, 50, 55, 60, 65, 70, 75, 80, 85, 90, 95, or 100. A Shore D hardness of the polymer can range from about 1 to about 70, about 60 to about 80, less than, equal to, or greater than about 1, 5, 10, 15, 20, 25, 30, 35, 40, 45, 50, 55, 60, 65, or 70.

Figure 2:
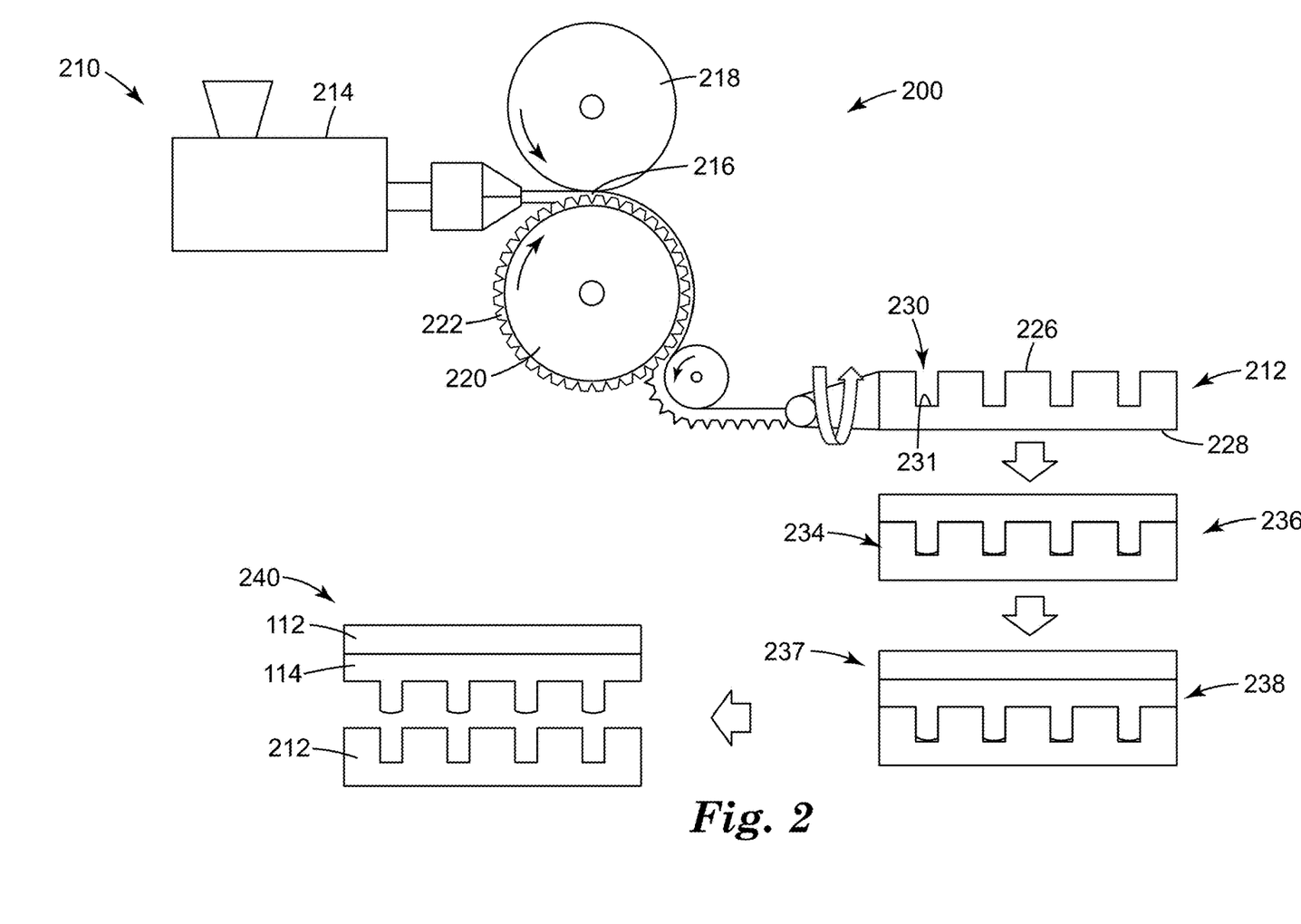
FIG. 2 is a schematic diagram of a method of making the abrasive sheet, in accordance with various embodiments.

Abrasive sheet 100 can be formed through many suitable methods. An example of a suitable method is shown in FIG. 2, which is a schematic depiction of a method of forming abrasive sheet 100. As shown in FIG. 2, method 200 includes multiple operations. Operation 210 includes forming support film 212. Although shown as a film, support film 212 can be a continuous belt or other suitable support structure. As shown, support film 212 is formed by feeding a molten stream of a support polymeric material from extruder 214 to nip point 216 between pressure roller 218 and forming roller 220. The support polymeric material can include one or more polymers. Non-limiting examples of suitable polymers include polypropylene, a polycarbonate, a polyurethane, polyethylene, polyamide, polyester, polyester terephthalate, glycol-modified polyethylene terephthalate, copolymers thereof, or mixtures thereof. The one or more polymers can range from about 50 wt % to about 100 wt % of the support polymeric material, about 60 wt % to about 100 wt %, about 70 wt % to about 95 wt %, less than, equal to, or greater than 50 wt %, 55, 60, 65, 70, 75, 80, 85, 90, 95, or 100 wt %.

Forming roller 220 includes a plurality of posts 222. Both pressure roller 218 and forming roller 220 can be adapted to be maintained at a temperature below a solidification temperature of the support polymeric material. As non-limiting examples, the solidification temperature can be a glass transition temperature, a crystallization temperature, or a gelation temperature of the support polymeric material. This can help to solidify the support polymeric material. The pressure roller 218 presses the polymeric material down in order to compress the polymeric material into a film forming holes around the posts. After passing through nip point 216, the polymeric material comes off forming roller 220 as support film 212. Additionally, maintaining rollers 218 and 220 below the solidification temperature can help to non-destructively remove support film 212 from pressure roller 218 and forming roller 220 such that substantially zero or at least a minimal amount of material is left on either of rollers 218 or 220.

Support film 212 has extrusion surface 226 and back surface 228. Extrusion surface 226 defines a major surface and includes a plurality of holes 230. In some examples of support film 212, holes 230 can span between extrusion surface 226 and back surface 228. In some examples, holes 230 are closed at intermediate layer 231, which is located proximate to back surface 228. In some circumstances it can be desirable to open intermediate layer 231 such that hole 230 extends fully between surfaces 226 and 228.

There are many suitable post-processing methods to open intermediate layer 231. An example of such a way can include flame treating back surface 228. In flame treating back surface 228, the temperature of the polymeric material is raised above its solidification temperature. This in turn can allow the support polymeric material to flow and open the end of hole 230 thereby creating a through hole in support film 212. Opening intermediate layer 231 can form a vent in support film 212 such that air can escape from holes 230 during extrusion of gripping layer 214.

There are additional suitable operations that can be used to form support film 212. For example, a sheet including the support polymeric material can be provided and holes 230 can be directly formed thereon. Holes 230 can be formed for example, through mechanical punching or laser drilling.

Method 200 further includes operation 234. Operation 234 includes forming abrasive sheet first assembly 236. To form assembly 236, the gripping layer polymeric material is dispensed to extrusion surface 226 of support film 212. As non-limiting examples, the gripping layer polymeric material and support film 212 can be fed into a nip such that the gripping layer polymeric material coats surface 226 of support film 212 and at least partially fills holes 230 of support film 212. Support film 212 can be fed directly into a nip from forming roller 220. Once removed from forming surface 226, support film may be conveyed directly into an extrusion coating process that applies gripping layer polymeric material. Alternatively, support film 212 can be cut into segments and those segments, in turn, can be fed into the extrusion coating process that applied gripping layer polymeric material. Support film 212 can include materials with a combination of melting temperature, enthalpy of fusion, and thermal conductivity that can allow support film 212 to remain intact during extrusion coating of gripping layer 114. Additionally, extrusion coating can be performed at a temperature above a glass transition temperature of the gripping layer polymer component but at a temperature at which support film 212 remains solid. This can help to allow the gripping layer polymeric material to flow into holes 230 while the structure of support film 212 remains intact. It should be noted that while extrusion coating is discussed herein other techniques such as hot pressing can also be used in conjunction with operation 234.

Although extrusion coating is described to form gripping layer 214 other techniques are within the scope of this disclosure. For example, a solution of the materials (e.g., first polymer component) can be applied to support film 212 and dried or cured thereon. In some examples, curing can include heating or exposure to radiation (e.g., light). In other examples, at least one of a solution of monomers, oligomers, polymers, and initiators (e.g., photoinitiators or thermoinitiators) can be applied the support film 112 and the solution can be cured thereon.

Method 200 further includes operation 237 in which gripping layer polymeric material is coated with abrasive layer 112. This forms second assembly 238. First assembly 236 can be cooled prior to being coated with abrasive layer 112. In order to allow the gripping layer polymeric material to set properly, either first assembly 236 or second assembly 238 can be adapted to cool for any suitable set time. Examples of suitable set times can range from about 30 minutes to about one month or about 5 hours to about 2 weeks. The set time can range for even longer period of time such as greater than 1 month or greater than 1 year. Adequate cooling of gripping layer 114 allows protrusions 116 to properly form.

Method 200 can further include operation 240 in which support film 212 is removed from gripping layer 114 to yield abrasive sheet 100. Following removal, support film 212 can be reused to form additional abrasive sheets 100. It can be desirable to remove gripping layer 114 from support film 212 in a substantially non-destructive manner such that a minimal amount, if any, of support film 212 and gripping layer 114 remain attached after operation 240. Substantial prevention of this can be accomplished by selecting materials in support film 212 and gripping layer 114, respectively, that are individually strong and have low chemical adhesion with each other. By chemical adhesion it is meant that the materials are less likely to form a bond or otherwise interact with each other. Further prevention of destructive removal can be accomplished by smoothing the surface of holes or by allowing gripping layer 114 to set for an appropriate amount of time. Also, a coating may be applied to the extrusion surface of support film 212 that is selected in order to reduce the adhesion to gripping layer 114.

Abrasive sheet 100 in turn can be flexed in a first direction to impart a high degree of flexibility in sheet 100 in that same direction. If it is not desirable to have a higher degree of flexibility in a particular direction or if a greater level of flexibility is desired, then abrasive sheet 100 can also be flexed in a second direction that is different than the first direction. In alternative examples, flexing can occur prior to operation 240

Mechanical flexing can be accomplished with a continuous roll-to-roll process. This can involve guiding abrasive sheet 100 around cylindrical bars of suitably small diameter to remove curvature. In addition to imparting flexibility in a desired direction, this can reduce the extent of curl induced by the fabrication process and can also improve the overall flexibility of abrasive sheet 100.

Abrasive sheet 100 can be used in many different ways. For example abrasive sheet 100 can be used to abrade a working surface of an object. In abrading the working surface protrusions 116 can be frictionally engaged with a substrate. Examples of substrates include a user's hand, a glove, a block, or tool. Abrasive layer 112 can be engaged with the working surface of the object and moved relative to the working surface to abrade the working surface. Abrasive sheet 100 can be dry or can be wet while in use. Additionally, abrasive sheet 100 can be folded such that protrusions 116 interlock with each other and resist slippage. In some examples, this can lead to more efficient sanding operation.

EXAMPLES

Various embodiments of the present disclosure can be better understood by reference to the following Examples, which are offered by way of illustration. The present disclosure is not limited to the Examples given herein.

The following abbreviations are used to describe the examples:
- ° C.: degrees Centigrade
- cm: centimeter
- G/eq.: grams per equivalent
- g/m$^2$: grams per square meter
- g/mol: grams per mole
- m/min: meters per minute
- mil: $10^{-3}$ inch
- mm: millimeter
- μm: micrometer
- rpm: revolutions per minute
- UV: ultraviolet
- W/in: Watts per inch
- W/cm: Watts per centimeter Unless stated otherwise, all reagents were obtained or are available from chemical vendors such as Sigma-Aldrich Company, St. Louis, Missouri, or may be synthesized by known methods. Unless otherwise reported, all ratios and percentages are by weight.

Abbreviations for materials and reagents used in the examples are as follows:

ACR: Trimethylolpropane triacrylate.

AMOX: Di-t-amyl oxalate.

CHDM: 1,4-cyclohexanedimethanol.

EP1: A bisphenol-A epichlorohydrin based epoxy resin having an epoxy equivalent weight of 525-550 g/eq. and an average epoxy functionality of 2, available as "EPON 1001F" from Momentive Specialty Chemicals, Inc., Columbus, Ohio.

EP2: A bisphenol-A epoxy resin having an epoxy equivalent weight of 185-192 g/eq. and an average epoxy functionality of 2, available as "EPON 828" from Momentive Specialty Chemicals, Inc., Columbus, Ohio.

EP3: (3',4'-epoxycyclohexylmethyl) 3',4'-epoxycyclohexanecarboxylate.

P800: A grade P800 aluminum oxide abrasive mineral, obtained under the trade designation "ALODUR BFRPL" from Treibacher Industrie AG.

PC1: Mixture of 4-thiophenylphenyl diphenyl sulfonium hexafluoroantimonate, and bis[4-(diphenylsulfonio)phenyl]sulfide bis(hexafluoroantimonate) in propylene carbonate, obtained under the trade designation CPI 6976 from Aceto Corporation, Port Washington, New York.

PC2: 2,2-dimethoxy-2-phenylacetophenone, obtained under trade designation IRGACURE 651 from BASF, Wyandotte, Michigan.

PC3: η$^6$-[xylene(mixed-isomers)]η$^5$-cyclopentadienyliron (1+) hexafluoro antimonate(1−).

PC4: Ethyl (2,4,6-trimethylbenzoyl) phenylphosphinate, obtained under the trade designation IRGACURE TPO-L from BASF, Wyandotte, Michigan.

PEP: A high molecular weight, hydroxyl-terminated, saturated, linear, semi-crystalline, copolyester, with a weight average molecular weight of 35,000 g/mol, available as "DYNAPOL S 1227" from Evonik Industries, Parsippany, New Jersey.

PI: 2-hydroxy-2-methyl-1-phenyl-1-propanone.

PPR: A polypropylene resin, obtained under the trade designation DOW C700-35N 35 MFI from Dow Chemical Company, Midland, Michigan.

PropCarb: Propylene carbonate, obtained under the trade designation JEFFSOL PC from Huntsman Corp, Woodlands, Texas.

PUR1: A polyurethane resin, obtained under the trade designation ESTAGRIP ST80A from Lubrizol Corporation, Wickliffe, Ohio.

PUR2: A polyurethane resin, obtained under the trade designation ESTANE 58887 from Lubrizol Corporation.

STY: Styrenic block copolymer, obtained under the trade designation VECTOR 4111A from TSRC Corporation, Taiwan.

ZNST: A 39-41 percent by weight aqueous zinc stearate soap dispersion obtained under trade designation EC994C from eChem LTD, Leeds, UK.

Preparation of Support Film

A polypropylene film was made by extruding PPR through a 6.35 cm single screw extruder to a 30.5" wide single layer die (obtained under the trade designation EDI from Nordson Extrusion Dies Industries LLC, Chippewa Falls, Wisconsin). The extrusion heating zone temperatures were as follows: Zone 1 was 190° C., Zone 2 was 204° C., Zones 3, 4, end cap, necktube and die were all 218° C. The extruder speed was 25 rpm.

The two rolls comprising the nip were water cooled rolls with a nominal 30.5 cm in diameter and 40.6 cm face widths. Nip force was provided by pneumatic cylinders. The smooth steel backup roll had a temperature set point of 18° C. The tooling roll had male post features cut into the surface of the roll. The male post features were chrome plated. The male features (defined as posts) on the tool surface were flat square topped pyramids with a square base, on top of which was a sharp pointed pyramid. The top of the posts were 76 μm square and the bases were 237 μm square on each side. The base of the sharp pointed pyramid was 76 μm on each side and the height of the sharp pointed pyramid on top was 51 μm. The overall post height was 508 μm. The center-to-center spacing of the posts was 820 μm in both the radial and cross roll directions. The tooling roll had a temperature set point of 65° C. The tooling roll and backup rolls were directly driven. The nip force between the two nip rolls was 109 Newtons per linear centimeter. The extrudate takeaway line speed was 9.14 m/min.

The polymer was extruded from the die directly into the nip between the tooling and backup roll. The male features on the tooling roll created indentations in the extrudate. A thin layer of polymer remained between the tooling and backup roll. Typically this layer was less than 20 μm thick. The extrudate remained on the tooling roll for 180 degrees of wrap to chill and solidify the extrudate into a polymeric film. The posts in the tool created cavities in the film that were about 350-μm (14 mils) deep. The average base thickness (the thickness in the area free of cavities) of the polypropylene film was also about 350-μm (14 mils).

The polymeric film containing indentations was then converted into a perforated film using the following procedure. A flame perforation system as described in U.S. Pat. No. 7,037,100 (Strobel et. al.), the disclosure of which is incorporated herein by reference, and utilizing the burner design from U.S. Pat. No. 7,635,264 (Strobel et. al.), the disclosure of which is incorporated herein by reference, was used to remove the thin layer at the bottom of the indentations.

Specific modifications to the equipment and process conditions for this experiment were as follows:

The chill roll was a smooth surface roll without an etched or engraved pattern.

The burner was a 30.5 centimeter (12 inch) six port burner, anti-howling design as described in U.S. Pat. No. 7,635,264 (Strobel et. al.), the disclosure of which is incorporated by reference, and was obtained from Flynn Burner Corporation, New Rochelle, N.Y.

Unwind Tension: 66 Newton total tension
Winder Tension: 44 Newton total tension
Burner BTU's: 8065 BTU/cm/hour
1% excess oxygen
Gap between burner and the film surface: 4.45 mm
Line Speed: 30 m/min.
Chill roll cooling water set point: 15.5° C.

The polymeric film was processed at the above conditions. The web orientation was such that the side of the film with the thin polymer layer was closest to the burner and opposite of the chill roll. The chill roll cooled the main body of the film, keeping the majority of the film below the softening point of the polymer. Heat from the burner flame caused the remaining thin polymer layer to melt thereby creating the perforations in the film.

Figure 3A:
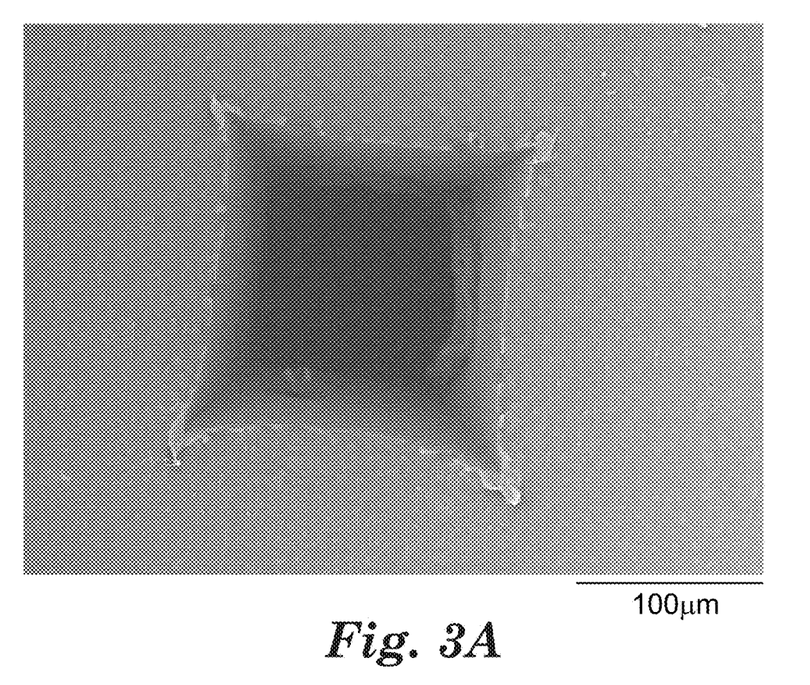
FIG. 3A is scanning electron microscope image of a front surface of a support film, in accordance with various embodiments.
Figure 3B:
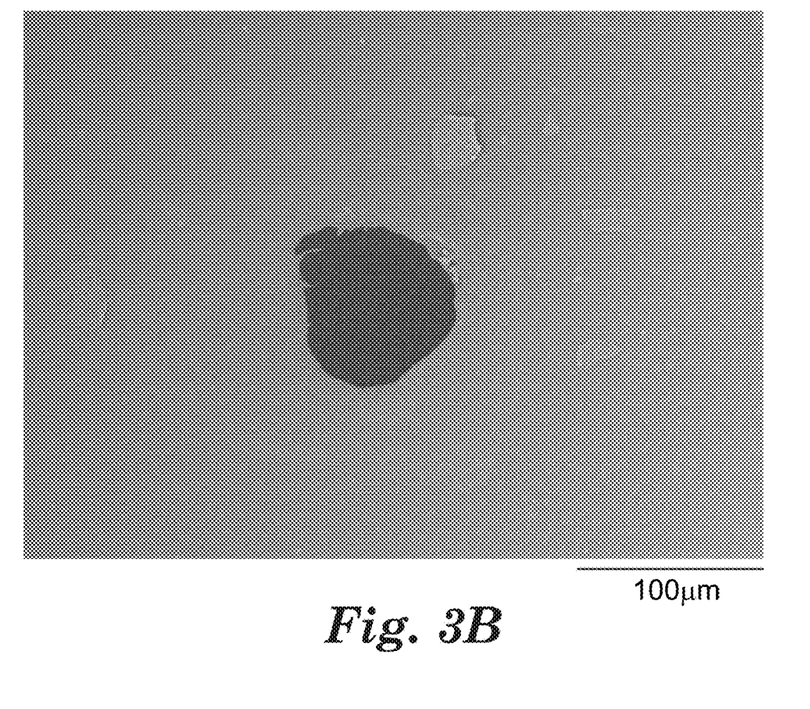
FIG. 3B is another scanning electron microscope image of the back surface of the support film, in accordance with various embodiments.

Exemplary scanning electron microscope image of the cavities on the first major surface of the support film and exemplary image of the holes on the back surface after flame treatment are shown in FIG. 3A and FIG. 3B, respectively.

Preparation of Make Resin

A make resin was prepared, according to the compositions listed in Table 1. AMOX, EP1, EP2, CHDM and PEP were directly metered to a twin screw extruder running at 300 rpm with temperature zones of 30, 105, 110, 100, 65, and 60° C. This mixed resin was then fed to a pin mixer running at 1750 rpm, and ACR, PC2, PC3, PC4, and PropCarb were directly metered into the pin mixer.

TABLE 1

| COMPONENT | MAKE RESIN COMPOSITION (% By Wt.) |
|---|---|
| EP1 | 24.0 |
| EP2 | 32.0 |
| PEP | 28.0 |
| ACR | 10.0 |
| CHDM | 2.8 |
| PC2 | 0.5 |
| PC3 | 0.7 |
| PC4 | 0.3 |
| PropCarb | 1.1 |
| AMOX | 0.6 |

Preparation of Size Resin

Table 2 below lists the components and the amounts used to formulate the Size Resin. The size resin was prepared by combining and mixing EP2, EP3 and ACR, in a container. Prior to abrasive making, PC1 and PI were added to the premixed resin batch and stirred for 30 minutes at room temperature (i.e., 20-24° C.) until homogeneous.

TABLE 2

| INGREDIENT TYPE | Size Resin (% by Weight) |
|---|---|
| EP3 | 28.8 |
| ACR | 28.8 |
| EP2 | 38.4 |
| PC1 | 3 |
| PI | 1 |

Example 1

PUR1 was extruded through twin screw extruder that was connected to both a gear pump and a single layer drop die The extrusion temperatures were as follows: Zone 1 was 179° C., Zone 2 was 192° C., Zones 3 was 192° C., and Zone 4 was 194° C., Necktube was 204° C. and die was at 193° C. The extruder speed was 100 rpm. The extrudate was contacted with the support film in a nip comprising two one roll that was steel and one rubber covered nip roll. Nip force was provided by pneumatic cylinders. The backup roll had a temperature set point of 27° C. The extrudate takeaway line speed was 1.27 m/min (4.16 feet per minute).

Figure 4A:
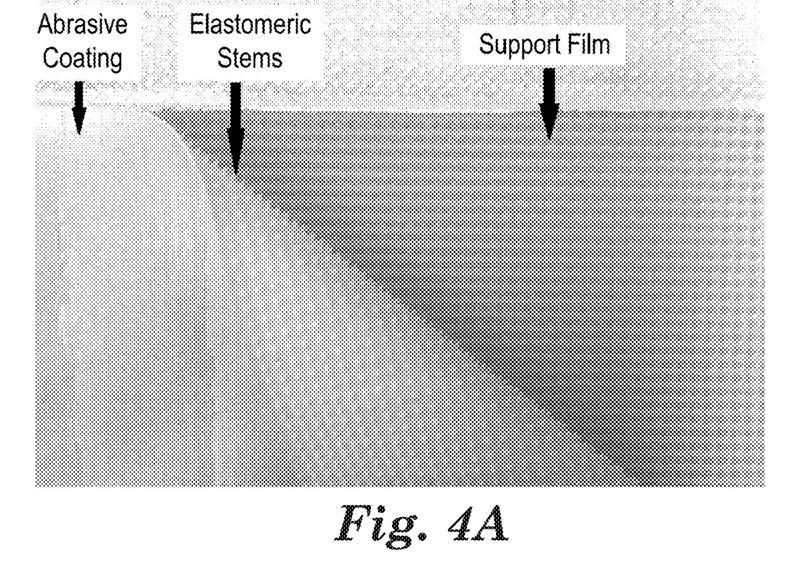
FIG. 4A is a photograph of the abrasive sheet and support film, in accordance with various embodiments.
Figure 4B:
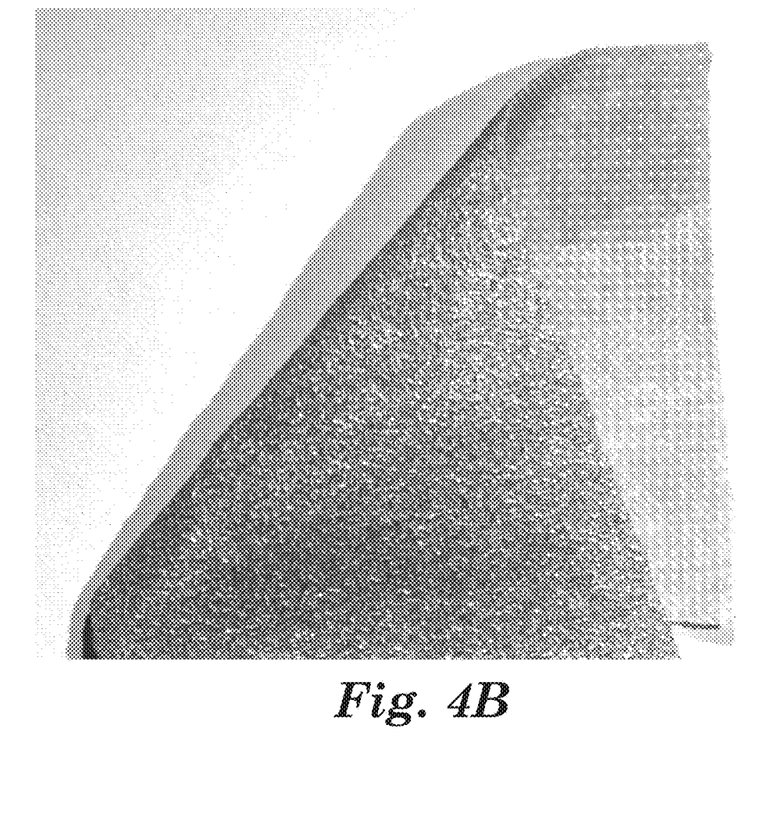
FIG. 4B is a photograph of the abrasive sheet, in accordance with various embodiments.

PUR1 was extrusion cast as a thermoplastic polyurethane film at an average thickness of 127 µm (5 mils), onto the Support Film using the twin screw extruder as described above. Optical microscopy analysis showed that PUR1 essentially filled the cavities in the Support Film and there was a roughly 96-µm thick base layer (the film connecting the posts) and the posts were about 380-µm tall. The Make Resin was then coated onto the polyurethane film at a nominal coating weight of 16.5 g/m$^2$ and the film assembly passed under a Fusion UV Systems with one set of D-bulbs and one set of V-bulbs, both operating at 600 W/in (236 W/cm). Abrasive mineral P800 was then coated onto the make layer at a nominal coating weight of 25 g/m$^2$ and the web was then heated under infrared heaters, at a nominal web temperature setting of 100° C., for about 7 seconds. The Size Resin was then roll coated onto the make layer and abrasive particles at a nominal dry coating weight of 11 g/m$^2$ and passed under a Fusion UV Systems with one set of H-bulbs, and two sets of D-bulbs, all three operating at 600 W/in (236 W/cm). The resin was then processed through infrared ovens having a target exit web temperature of 125° C. ZNST at a nominal coating weight of 8.5 g/m$^2$ was then coated onto the size layer and processed through a drying oven with a target exit web temperature of 135° C. The support film was then separated from the construction (as shown in FIG. 4A) to produce an abrasive article with an abrasive coating on one side and an array of posts on the other side (as shown in FIG. 4B). The resultant coated abrasive article was then maintained at room temperature (i.e., 20-24° C.) and 40-60 percent relative humidity.

The abrasive surface of coated abrasive article was then tested on an automotive test panel available from ACT (Item #: 59597). It was noted that there was sufficient friction to move the abrasive by moving the sanding pad.

Example 2

The procedure generally described in Example 1 was repeated, with the exception that PUR2 was used instead of PUR1, and the temperature of the neck tube and the die during extrusion was 182° C. Optical microscopy analysis showed that PUR1 essentially filled the cavities in the Support Film and there was a roughly 118-µm thick base layer (the film connecting the posts) and the posts were about 274-µm tall.

The abrasive surface of coated abrasive article was then tested on an automotive test panel available from ACT (Item #: 59597). It was noted that there was sufficient friction to move the abrasive by moving the sanding pad.

Example 3

The procedure generally described in Example 1 was repeated, with the exception that a polyurethane blend of 60% PUR1 and 40% STY was used instead of PUR1, and the die was at 215° C. during extrusion, Optical microscopy analysis showed that polyurethane blend essentially filled the cavities in the Support Film and there was a roughly 107-μm thick base layer (the film connecting the posts) and the posts were about 241-μm tall.

The abrasive surface of coated abrasive article was then tested on an automotive test panel available from ACT (Item #: 59597). It was noted that there was sufficient friction to move the abrasive by moving the sanding pad.

Additional Embodiments

The following exemplary embodiments are provided, the numbering of which is not to be construed as designating levels of importance:

Embodiment 1 provides an abrasive sheet comprising:
a first layer defining an abrasive first major surface; and
an opposite second layer defining a second major surface comprising:
a plurality of protrusions extending outwardly from the second major surface, wherein the protrusions comprise a first polymer component having at least one of a Shore A hardness ranging from about 5 to about 100 and a Shore D hardness ranging from about 1 to about 70,
wherein the first layer directly contacts the second layer.

Embodiment 2 provides the abrasive sheet of Embodiment 1, wherein the first polymer component has at least one of a Shore A hardness ranging from about 20 to about 40 and a Shore D hardness ranging from about 60 to about 80.

Embodiment 3 provides the abrasive sheet of Embodiment 1, wherein the first polymer component independently ranges from about 50 wt % to about 100 wt % of the individual protrusions.

Embodiment 4 provides the abrasive sheet of any one of Embodiments 1-3, wherein the protrusions are arranged in a replicated two-dimensional pattern.

Embodiment 5 provides the abrasive sheet of any one of Embodiments 1-4, wherein the protrusions have a height-to-width aspect ratio ranging from about 0.5 to about 10.

Embodiment 6 provides the abrasive sheet of any one of Embodiments 1-5, wherein the protrusions have a height-to-width aspect ratio ranging from about 1 to about 6.

Embodiment 7 provides the abrasive sheet of any one of Embodiments 1-6, wherein the protrusions have a height-to-width aspect ratio ranges from about 1.25 to about 6.

Embodiment 8 provides the abrasive sheet of any one of Embodiments 1-7, wherein the protrusions have a height ranging from about 10 micrometers to about 800 micrometers.

Embodiment 9 provides the abrasive sheet of any one of Embodiments 1-8, wherein the protrusions have a height ranging from about 50 micrometers to about 600 micrometers.

Embodiment 10 provides the abrasive sheet of any one of Embodiments 1-9, wherein the protrusions have a height ranging from about 100 micrometers to about 800 micrometers.

Embodiment 11 provides the abrasive sheet of any one of Embodiments 1-10, wherein the protrusions are substantially free of undercuts.

Embodiment 12 provides the abrasive sheet of any one of Embodiments 1-11, wherein the protrusions have an area number density ranging from about 15 per square centimeter to about 3,000 per square centimeter.

Embodiment 13 provides the abrasive sheet of any one of Embodiments 1-12, wherein the protrusions have an area number density ranging from about 100 per square centimeter to about 1000 per square centimeter.

Embodiment 14 provides the abrasive sheet of any one of Embodiments 1-13, wherein the protrusions have a constant cross-sectional shape.

Embodiment 15 provides the abrasive sheet of any one of Embodiments 1-13, wherein the protrusions have variable cross-sectional shape.

Embodiment 16 provides the abrasive sheet of any one of Embodiments 1-15, wherein the first polymer component comprises one or more polymers.

Embodiment 17 provides the abrasive sheet of Embodiment 16, wherein the one or more polymers is an elastomer chosen from a polyurethane, a styrene-ethylene-butylene-styrene block copolymer, a styrene-isoprene-styrene block copolymer, or mixtures thereof.

Embodiment 18 provides the abrasive sheet of any one of Embodiments 1-17, wherein the abrasive sheet has a monolithic gripping layer having a composition substantially the same as the protrusions, the protrusions extending therefrom.

Embodiment 19 provides an abrasive sheet of any one of Embodiments 1-18, wherein the first abrasive surface comprises a plurality of abrasive particles.

Embodiment 20 provides a method of making the abrasive sheet of any one of Embodiments 1-19, the method comprising:
forming a first assembly, the first assembly comprising:
a support having a plurality of holes defined on a support major surface; and
the first polymer component at least partially filling at least one of the holes of the support and forming a layer thereon; and
coating the first polymer component with an abrasive material.

Embodiment 21 provides the method of Embodiment 20, further comprising disposing an adhesive on the first polymer component.

Embodiment 22 provides the method of any one of Embodiments 19 or 20, wherein the support is stiffer than the first polymer component.

Embodiment 23 provides the method of Embodiment 22, wherein at least one of a Shore D hardness and a Shore A hardness of the support is greater than the Shore D hardness and a Shore A hardness of the first polymer component.

Embodiment 24 provides the method of any one of Embodiments 20-23, wherein the support comprises a support polymer component.

Embodiment 25 provides the method of Embodiment 24, wherein the support polymer component range from about 50 wt % to about 100 wt % of the support.

Embodiment 26 provides the method of Embodiment 25, wherein the support polymer component comprises one or more polymers.

Embodiment 27 provides the method of Embodiment 26, wherein the one or more polymers are chosen from polypropylene, a polycarbonate, a polyurethane, polyethylene, polyamide, polyester, polyester terephthalate, glycol-modified polyethylene terephthalate, copolymers thereof, or mixtures thereof.

Embodiment 28 provides the method of Embodiment any one of Embodiments 20-27, wherein forming the first assembly includes extrusion or hot-pressing.

Embodiment 29 provides the method of Embodiment 28, wherein extrusion is performed at a solidification temperature above a solidification temperature of the first polymer component but below a solidification temperature of the support.

Embodiment 30 provides the method of any one of Embodiments 20-29, further comprising cooling the abrasive sheet.

Embodiment 31 provides the method of any one of Embodiments 20-30, wherein the abrasive sheet is cooled for a time ranging from about 30 minutes to about two weeks.

Embodiment 32 provides the method of any one of Embodiments 20-31, wherein the abrasive sheet is cooled for a time ranging from about 5 hours to about 1 week.

Embodiment 33 provides the method of any one of Embodiments 20-32, further comprising removing the support to expose the plurality of protrusions.

Embodiment 34 provides the method of any one of Embodiments 20-33, further comprising arranging abrasive particles of the abrasive layer in a predetermined pattern.

Embodiment 35 provides the method of Embodiment 33, further comprising flexing the abrasive sheet in a first direction.

Embodiment 36 provides the method of Embodiment 35, further comprising flexing the abrasive sheet in a second direction that is different than the first direction.

Embodiment 37 provides the method of any one of Embodiments 20-36, further comprising forming the support.

Embodiment 38 provides the method of Embodiment 37, wherein forming the support comprises:
dispensing the support polymer component on a tool having plurality of posts to form a plurality of cavities in the support polymer component to form a support precursor.

Embodiment 39 provides the method of Embodiment 38, further comprising flame treating one side of the support precursor to close one end of each of the plurality of cavities and form the holes.

Embodiment 40 provides a method of using the abrasive sheet of any one of Embodiments 1-19 or the abrasive sheet formed by the method of any one of Embodiments 20-39, the method comprising:
frictionally engaging the plurality of protrusions with a substrate;
engaging the first abrasive surface with a working surface of an object;
moving the abrasive sheet relative to the working surface to abrade the working surface.

Embodiment 41 provides the method of Embodiment 40 further comprising:
rubbing the plurality of protrusions against the working surface of the object to dislodge swarf or debris thereon.

Embodiment 42 provides the method of any one of Embodiments 39-41 further comprising wetting the abrasive sheet.

What is claimed is:

1. A method of making an abrasive sheet comprising:
forming a first assembly, the first assembly comprising:
a support having a plurality of holes defined on a support major surface, wherein the support is a support film that has an extrusion surface and a back surface, and the holes penetrate from the extrusion surface to the back surface; and
a first polymer component at least partially filling at least one of the holes of the support and forming a layer thereon; and
coating the first polymer component with an abrasive material.

2. The method of claim 1, wherein the first polymer component comprises one or more polymers chosen from a polyurethane, a styrene-ethylene-butylene-styrene block copolymer, a styrene-isoprene-styrene block copolymer, or mixtures thereof.

3. The method of claim 1, wherein the support surface is stiffer than the first polymer component.

4. The method of claim 1, wherein the support comprises a support polymer component.

5. The method of claim 4, wherein the support polymer component comprises one or more polymers chosen from polypropylene, a polycarbonate, a polyurethane, polyethylene, polyamide, polyester, polyester terephthalate, glycol-modified polyethylene terephthalate, copolymers thereof, or mixtures thereof.

6. The method of claim 1, wherein forming the first assembly includes extrusion or hot-pressing.

7. The method of claim 1, further comprising cooling the abrasive sheet.

8. The method of claim 1, further comprising removing the support to expose the plurality of protrusions.

9. The method of claim 1, further comprising forming the support.

10. A method of using the abrasive sheet made according to the method of claim 1, comprising:
frictionally engaging the plurality of protrusions with a substrate;
engaging the abrasive first major surface with a working surface of an object;
moving the abrasive sheet relative to the working surface to abrade the working surface.

11. The method of claim 10 further comprising:
rubbing the plurality of protrusions against the working surface of the object to dislodge swarf or debris thereon.

12. The method of claim 1 wherein the first polymer component comprises monolithic gripping layer comprising:
a plurality of protrusions extending outwardly from the second major surface, wherein the protrusions comprise a first polymer component having at least one of a Shore A hardness ranging from about 5 to about 100 and a Shore D hardness ranging from about 1 to about 70.

13. The method of claim 12 wherein the protrusions have a height-to-width aspect ratio ranging from about 0.5 to about 10.

14. The method of claim 12 wherein the abrasive material forms an abrasive layer comprising a make resin and a plurality of abrasive particles adhesively coupled to the make resin.

15. The method of claim 14, wherein make resin from the abrasive layer directly contacts the monolithic gripping layer.

16. The method of claim 1, wherein the holes are initially closed at an intermediate layer proximate to the back surface and are subsequently opened to penetrate fully between the extrusion surface and the back surface.

17. The method of claim 16, wherein the intermediate layer is opened by flame treating the back surface of the support.

18. The method of claim 16, wherein the support is a continuous belt.

19. The method of claim 4, wherein the support is formed by extruding the support polymer component onto a forming roller having a plurality of posts, creating the plurality of holes in the support.

20. The method of claim 19, wherein the forming roller and a pressure roller are maintained at a temperature below the solidification temperature of the support polymer component to facilitate the formation of the holes.

21. The method of claim 1, further comprising removing the support from the first polymer component after the first polymer component has set, exposing the plurality of protrusions formed by the first polymer component filling the holes.

\* \* \* \* \*